United States Patent [19]

Shanton et al.

[11] 4,331,634
[45] May 25, 1982

[54] SOLVENT EXTRACTION PROCESS FOR THE SELECTIVE EXTRACTION OF PALLADIUM

[75] Inventors: Kenneth J. Shanton, Sonning Common; Richard A. Grant, Usbridge, both of England

[73] Assignee: Matthey Rustenburg Refiners (Pty) Limited, Johannesburg, South Africa

[21] Appl. No.: 207,703

[22] Filed: Nov. 17, 1980

Related U.S. Application Data

[63] Continuation of Ser. No. 3,287, Jan. 15, 1979, abandoned.

[30] Foreign Application Priority Data

Jan. 17, 1978 [GB] United Kingdom ............... 1819/78

[51] Int. Cl.³ .............................................. C01G 55/00
[52] U.S. Cl. .................................. 423/22; 75/101 BE
[58] Field of Search ........................ 423/22, DIG. 14; 75/101 BE

[56] References Cited

U.S. PATENT DOCUMENTS

| 3,437,431 | 4/1969 | Platz et al. ............................ 423/22 |
| 3,967,956 | 7/1976 | Payne .................................... 423/22 |
| 4,041,126 | 8/1977 | Blatz et al. ............................ 423/22 |
| 4,058,585 | 11/1977 | Mackay et al. . |
| 4,104,359 | 8/1978 | Davis et al. .................... 75/101 BE |
| 4,105,742 | 8/1978 | Edwards et al. ..................... 423/22 |

OTHER PUBLICATIONS

Stella et al., "Radiochem. Radioanal. Letters", 16/6, 1974, pp. 273-282.

*Primary Examiner*—Herbert T. Carter
*Attorney, Agent, or Firm*—Cushman, Darby & Cushman

[57] ABSTRACT

The separation and purification of palladium present in aqueous solutions which also contain other platinum group metals is accomplished by a process which involves contacting an acidic aqueous solution containing the palladium and other platinum group metals with an organic phase containing an oxime extractant and an anionic phase transfer material substantially soluble in the organic phase and substantially insoluble in the aqueous solution, and removing from contact with the acidic solution the organic phase containing substantially all of the palladium.

19 Claims, 2 Drawing Figures

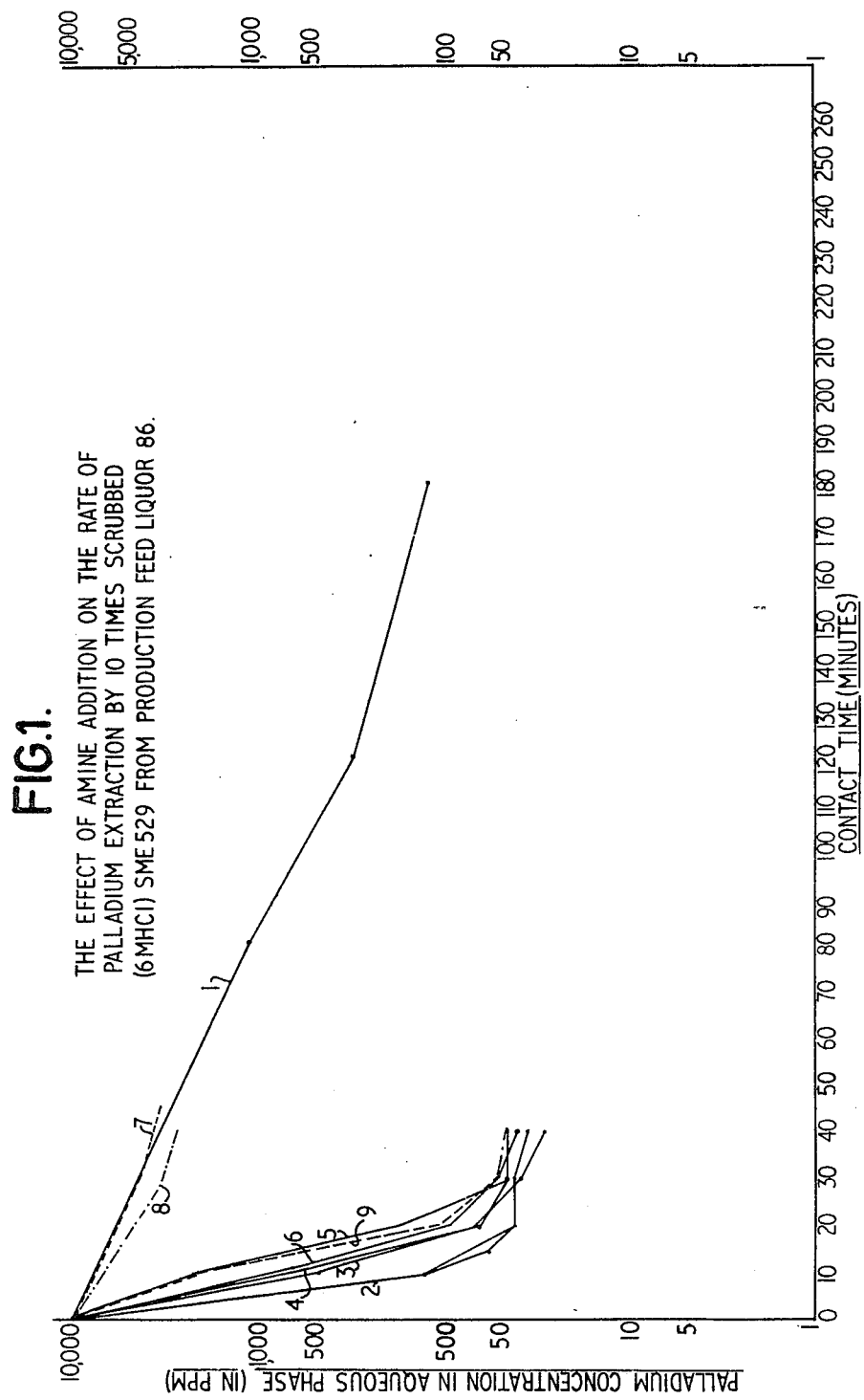

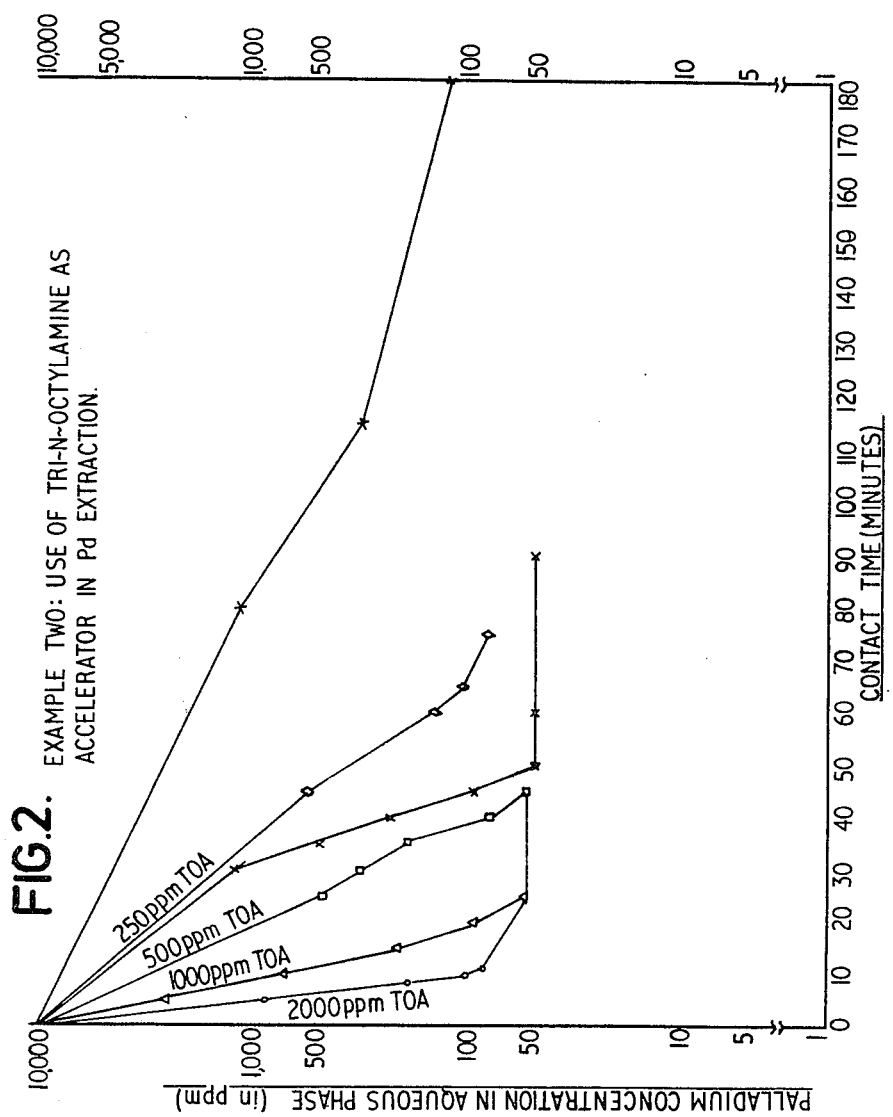

SOLVENT EXTRACTION PROCESS FOR THE SELECTIVE EXTRACTION OF PALLADIUM

This is a continuation of application Ser. No. 3,287 filed Jan. 15, 1979 and now abandoned.

This invention relates to the separation and purification of the platinum group metals, and more particulatly to the separation and purification of palladium present in aqueous solutions which also contain one or more of the salts of platinum, rhodium, ruthenium, osmium and iridium and the salts of base metals.

Solutions obtained in the recovery of mineral deposits of the platinum metals commonly contain ruthenium, osmium, rhodium, palladium, iridium and platinum and small quantities of base metals such as iron, copper, nickel, selenium, tellurium and antimony.

It is one object of the present invention to separate palladium from the above-mentioned base metals and also from the other platinum group metals present. It is a further object of the present invention to obtain palladium having a high degree of purity.

In our U.S. Pat. No. 3,967,956 there is described a process for the separation and purification of the palladium present in platinum group metal-containing solutions with (in one embodiment) comprises the following steps:

(a) adjustment, if necessary, of the pH of the platinum group metal-containing solution to render it acidic;

(b) contacting the so-obtained acidic solution with an oxime containing solvent;

(c) removing from contact with the acidic solution the organic phase containing substantially all of the palladium present in association with the oxime solvent; and (d) stripping the palladium, in the form of one or more complex anions, from the organic phase containing the said oxime by the use of a strongly acidic solution.

The acidic solution used at step (d) is preferably one having a strength within the range 3N–12N. Suitable acids which may be used are aqueous solutions of sulphuric acid, perchloric acid, hydrochloric acid or nitric acid.

In the operation of this invention we have now found after recycling certain oxime containing solvents over a period of time (e.g. ten extractions of palladium followed each time by stripping with 6M hydrochloric acid solution) that the rate of palladium extraction deteriorates considerably.

Whatever the reason for the reduced rate of reaction observed, however, it is a further object of the present invention to enable rapid solvent extraction of palladium to be obtained over a period of time and thus to counteract or prevent the above-noted deterioration in rate of prior art methods.

According to the present invention a process for the separation and purification of the palladium which is present in a platinum group metal-containing aqueous solution comprises the following steps:

(a) adjustment, if necessary, of the pH of the platinum group metal-containing aqueous solution to render it acidic;

(b) contacting the so-obtained acidic solution with an organic phase containing an oxime extractant and an anionic phase transfer material substantially insoluble in said aqueous solution;

(c) removing from contact with the acidic solution the organic phase containing substantially all of the palladium. The direction of the equilibrium:

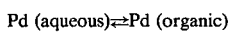

at pH: with efficient mixing and with a substantially sodium chloride-free solution of sodium chloropalladite is massively to the right. For all practical purposes the reaction is complete with the distribution coefficient tending towards infinity. With fresh oxime extractant equilibrium is reached in 40–50 minutes at 45° C. After the oxime has been recycled ten times, i.e. after an extractant such as SME 529 (referred to as RD 529 in U.S. Pat. No. 3,967,956) has been scrubbed ten times with 6M MCl solution, the equilibrium is arrived at after 180 minutes in the absence of the anionic phase transfer material. In one example the addition of anionic phase transfer material comprising primary amine t-$C_{18-22}H_{37-45}NH_2$ "Primene JMT" (Registered Trade Mark) at a concentration of 0.0028M to a 15% $v/v$ solution of SME 529 in Solvesso 150 reduces this time back to 20 minutes. This the anionic phase transfer material, referred to in step (b) considerably accelerates the extraction process and effectively, we believe, catalyses the reaction. Throughout the remainder of this specification, the anionic phase transfer material will, for convenience, be referred to as an "anionic phase transfer catalyst". We prefer to use a 15% $v/v$ solution of the oxime in an aromatic or aliphatic hydrocarbon diluent. The one we prefer to use is Solvesso 150 (Registered Trade Mark) which is an aromatic hydrocarbon solvent sold by Esso Chemicals Ltd. The strength of oxime in the hydrocarbon diluent may conveniently range from 5% to 25%.

The presence of ruthenium in the naturally occurring proportion has no effect on the extraction of palladium nor on its subsequent recovery. Levels of osmium usually present in the platinum group metal solutions to which this invention is applied produce a negligible quantity of the metal in the extract palladium.

Adjustment of pH at step (a) is preferably carried out by the addition of an aqueous solution of acid or alkali. We prefer to use dilute sodium hydroxide solution or dilute hydrochloric acid solution (according to the initial pH of the liquor) to give an acidity within the range 3N to pH 4, preferably a pH of about 1.

Oximes used in step (b) are preferably hydroxy omines. Hydroxy oximes which are preferably used are those selected from the group comprising alpha hydroxy oximes of the general formula:

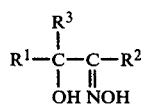

and orthohydroxyphenoneoximes of the general formula:

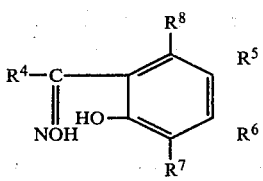

where $R^1$, $R^2$, $R^3$ and $R^4$ are the same or different and may be hydrogen, alkyl, aryl, aralkyl, alkaryl and substituted alkyl, aryl, aralkyl and alkaryl groups in which the substituent is inert to the palladium solvent extraction reaction conditions; $R^1$, $R^2$ and $R^4$ are preferably normal or iso alkyl groups within the range $C_1$-$C_{12}$ (and more preferably $C_4$-$C_{10}$) or aryl (preferably phenyl); $R^3$ is preferably hydrogen; $R^5$, $R^6$, $R^7$ and $R^8$ are preferably all hydrogen but may be normal or iso alkyl preferably within the range $C_1$-$C_{12}$ and substituted normal or iso alkyl preferably within the range $C_1$-$C_{12}$ in which the substituent is inert to the palladium solvent extraction reaction conditons. Examples of such inert substituents are halogeno or nitro groups.

Typical substituents which are inert to the palladium solvent extraction reaction conditions are halogen and nitro groups.

Oxime extractants which can be used are the LIX series of extractants LIX 63, 64, 64N, 65, 70, 71 and 73 and solvent XI - 8A sold by the General Mills Corporation, Minneapolis, USA. In the LIX series of oximes, which may conform to either of the general formulae for hydroxyoximes given above, $R^1$ and $R^2$ may be both alkyl or both aryl or mixed alkyl and aryl. $R^3$ and $R^4$ in the LIX series are normally both alkyl (or hydrogen in the case of $R^4$) but can be aryl.

In oxime XI8A, which is of the type given by the first general formula given above, $R^1$ and $R^2$ are normal alkyl lying within the range $C_4$-$C_{10}$.

An alternative oxime which are prefer to use is SME 529 (formerly RD 529) manufactured by Shell Chemicals. Others are ACORGA P5000 and ACORGA P17 (Registered Trade Marks) supplied by Imperial Chemical Industries Ltd. SME 529 is an orthohydroxyphenoneoxime having the formula:

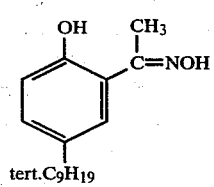

The ACORGA P5000 series are also orthyhydroxyaryloximes in which H replaces methyl in the above formula.

After step (c) the palladium is preferably stripped from the oxime by the use of a relatively strong acidic solution having a strength within the range 3N–12N.

Suitable acids which may be used are aqueous solutions of sulphuric acid, perchloric acid, hydrochloric acid or nitric acid.

The anionic phase transfer catalyst which is used in step (b) of the present invention is preferably a compound selected from the group consisting of primary amines, secondary amines, tertiary amines, quaternary ammonium compounds, and certain sulphur - phosphorous - and arsenic - containing organic compounds, all of said compounds having the required solubility limitations.

In order for the solubility limitations to be met, we have found that generally the molecular weight of the anionic phase transfer catalyst should be within the approximate range 150 to 900 inclusive. Compounds having a molecular weight substantially below 150 tend in general to be too soluble in the said aqueous solution and compounds having a general molecular weight substantially in excess of 900 tend in general to be too insoluble in the said organic phase.

The invention is illustrated by the following examples and the accompanying drawings wherein FIGS. 1 and 2 show results obtained on the basis of these examples.

EXAMPLE 1

This example shows the effect of addition of various amines or quaternary ammonium compounds on the rate of palladium extraction by the oxime SME 529 which has been ten times scrubbed with 6M HCl. An aqueous production feed liquor having the following composition was used:

|  | grams/liter |
|---|---|
| Pt | 50.0 |
| Pd | 10.00 |
| Rh | 2.90 |
| Ru | 3.26 |
| Os | 0.01 |
| Ir | 0.63 |
| Ni | 5.0 |
| Cu | 1.8 |
| Other base metals | 1.0 |

The numerical results are tabulated below and shown in graphical form in FIG. 1. All results were obtained when operating at 45° C. In FIG. 1 the key of numbers used to designate the various graphs in the figure is as follows:

KEY

1. SME 529 (10 scrubs)
2. Primene JMT +0.0028 mole added
3. Aliquat 336
4. Hostarex 336
5. Alamine 336
6. Amberlite LA2
7. TBP
8.* n-octylamine
9. Adogen 381

| Nitrogen containing organic compound | Contact time minutes | | | | | | | | | | |
|---|---|---|---|---|---|---|---|---|---|---|---|
| | 0 | 10 | 15 | 20 | 30 | 40 | 50 | 60 | 80 | 120 | 180 |
| | Palladium concentration in aqueous phase (ppm) | | | | | | | | | | |
| (a) SME 529 ALONE (fresh) | 10000 | — | — | — | 1170 | 220 | 47 | — | — | — | — |
| (b) SME 529 ALONE (10X scrubbed) | 10000 | — | — | — | — | — | — | — | 1100 | 297 | 117 |

-continued

| Nitrogen containing organic compound | Contact time minutes |  |  |  |  |  |  |  |  |  |  |
|---|---|---|---|---|---|---|---|---|---|---|---|
|  | 0 | 10 | 15 | 20 | 30 | 40 | 50 | 60 | 80 | 120 | 180 |
|  | Palladium concentration in aqueous phase (ppm) |  |  |  |  |  |  |  |  |  |  |
| (c) SME 529 (10X scrubbed) plus: |  |  |  |  |  |  |  |  |  |  |  |
| ALIQUAT 336 (1400 ppm) | 10000 | 468 | — | 68 | 38 | 28 | — | — | — | — | — |
| HOSTAREX A327 (1480 ppm) | 10000 | 664 | — | 63 | 45 | 45 | — | — | — | — | — |
| PRIMENE JMT (830 ppm) | 10000 | 127 | 59 | 42 | 42 | 36 | — | — | — | — | — |
| ALAMINE 336 (1100 ppm) | 10000 | 2145 | — | 167 | 45 | 44 | — | — | — | — | — |
| AMBERLITE LA2 (1040 ppm) | 10000 | 763 | — | 96 | 51 | 42 | — | — | — | — | — |
| ADOGEN 381 (990 ppm) | 10000 | 1154 | — | 109 | 51 | 46 | — | — | — | — | — |
| N-octylamine (360 ppm) | 10000 | 6847 | — | 4685 | 3257 | 2720 | — | — | — | — | — |
| (Tributylphosphate (745 ppm) | 10000 | 7200 | — | 5704 | 4369 | 3697 | — | — | — | — | — |

NOTES TO TABLE (i) Alamine (Registered Trade Mark) Alamines are tertiary amines supplied by General Milles Inc. Alamine 336 is predominantly trioctylamine but ranges $C_8-C_{10}$. Approx. molecular weight = 393.

(ii) Aliquat (Registered Trade Mark) Aliquats are quaternary compounds supplied by General Mills Inc. Aliquat 336 is methyl tri-n-alkylammonium chloride, a quaternary having predominantly $C_8-C_{10}$ normal alkyl groups. Approx. molecular weight = 443.

(iii) Hostarex (Registered Trade Mark) Hostarex A327 is a quaternary ammonium compound (tri-n-octyl n-decyl ammonium chloride) supplied by Hoechst A.G. in which the N has normal aliphatic substituents, predominantly $C_8$. Approx. molecular weight = 529.

(iv) Primene (Registered Trade Mark) Primene JMT is a primary amine supplied by Rohm & Haas Inc. in which the N has one tertiary alkyl substituent, i.e. $t-C_{18-22}H_{37-45}NH_2$. Approx. molecular weight = 296.

(v) Adogen (Registered Trade Mark) Adogen 381 is a tertiary amine, triisooctylamine supplied by Ashland Chemicals. Approx. molecular weight = 353.

(vi) Amberlite (Registered Trade Mark) Amberlite LA2 is a secondary amine supplied by Rohm & Haas Inc. having a molecular weight within the range 353–395.

(vii) n-octylamine has a molecular weight of 129.

It can be seen that n-octylamine (with a low molecular weight) and tributylphosphate, which were tested for comparative purposes only, are generally unsuccessful in accelerating the rate of reaction.

EXAMPLE 2

A range of concentrations of tri n-octylamine(-molecular weight 353) was used to assess the dependence of the acceleration effect on molarity of added amine. The conditions were otherwise as described in Example 1 with oxime SME 529 as the principal extractant present at a strength of 15% $v/v$ in Solvesso 150. The results are as shown in FIG. 2. The addition of 2000 ppm tri n-octylamine (i.e. 0.0057M) reduces the contact time from 180 to 10 minutes for the palladium concentration to be reduced from 10000 to 100 (approx.) ppm.

According to a second aspect of the present invention a process for the separation and purification of the palladium which is present in platinum group metal-containing solutions comprises the following steps:

(a) acidifying the platinum group metal-containing solution to give a pH within the range 0–4;

(b) contacting the acidified solution by means of a solvent extraction technique with an organic solvent containing:

A. a hydroxyoxime extractant selected from the group consisting of alpha hydroxyoximes of the general formula:

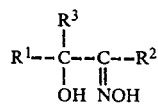

and orthohydroxyphenyloximes of the general formula:

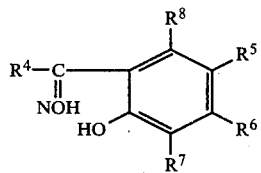

where:

(I) $R^1$, $R^2$, $R^3$ and $R^4$ may be the same or different and are selected from the group consisting of hydrogen, unsubstituted alkyl, aryl, aralkyl and alkaryl and subsituted alkyl, aryl, aralkyl and alkaryl in which the subsitituent is inert to the palladium solvent extraction reaction conditions;

(II) $R^5$, $R^6$, $R^7$ and $R^8$ may be the same or different and are selected from the group consisting of halogen, nitro, hydrogen, unsubstituted normal or iso alkyl and substituted normal or iso alkyl in which the substituent is inert to the palladium solvent extraction conditions, and B an anionic phase transfer catalyst at a minimum concentration of 100 ppm based on the total of said organic solvent plus hydroxyoxime extractant, said reagent being substantially soluble in said organic solvent and substantially insoluble in said platinum group metal containing solution.

(c) removing from contact with the acidified aqueous solution an organic phase containing substantially all of the palladium present in association with the said oxime extractant and (d) stripping the palladium from the organic phase containing the oxime extractant by the use of a strongly acidic solution.

The acidic solution used at step (d) is preferably one having a strength within the range 3N–12N. Suitable acids which may be used are aqueous solutions of sulphuric acid, perchloric acid, hydrochloric acid or nitric acid.

Known techniques may be used for ensuring adequate contact of the hydroxy oxime solvent with the acidic solution as described in step (b) above (in both aspects of the invention). If the operation is being carried out on a large scale, a multi-stage counter-current extraction assembly may be used. See (i) "The Design of a Simple Mixer-Settler" by Williams, Lowes & Tanner; Transactions of the Institution of Chemical Engineers Vol. 36, 1958 pages 464–475 and (ii) "Design of Large Scale Mixer-Settlers" by Lott, Warwick & Scuffham; Transactions of SME Vol. 252, March 1972. Alternatively the two phases may be vigorously agitated together by shaking, stirring etc.

At step (c) above (in both aspects of the invention) the organic phase containing substantially all of the palladium present in association with the oxime used in step (b) is normally removed by physical methods as the phase separation is quite distinct.

The invention also includes palladium obtained using the process of the invention.

The present invention lends itself to operation in a single multi-stage counter-current extraction assembly and accordingly a further feature of the invention includes the use of a counter-current extraction assembly for the separation of palladium from aqueous solutions of one or more of the platinum group metals rhodium, platinum ruthenium, osmium, iridium, palladium and base metals as described above.

Primary amines which may be used as anionic phase transfer catalysts in step (b) of both aspects of the invention are those of the type $RNH_2$ where R is normal-, iso or cycloaliphatic aromatic or mixed aliphatic and aromatic, either substituted or unsubstituted. Preferred R groups are branched chain alkyl giving a molecular weight to the amine of at least 150 Branched chain alkyl groups ranging from $C_{10}$ to $C_{25}$ are preferred.

Secondary amines which may be used in steps (b) above (in both aspects of the invention) are the R groups and are the same or different and may be aliphatic, aromatic or mixed aliphatic and aromatic, either substituted or unsubstituted, or together may form an aliheterocyclic ring with the N atom. Preferred R groups are alkyl ranging from $C_6$ to $C_{12}$. Iso-alkyl and cycloalkyl groups may also be used, however, and R may therefore be selected from the group comprising the normal a iso and cycle isomers of hexyl, heptyl, octyl, nonyl, decyl, undecyl and dodecyl alkyl groups.

Examples of commercially available secondary amines which may be used are:

(a) N-dodecyl (trialkylemthyl) amine (Amberlite LA 1 (Registered Trade Mark); a secondary amine supplied by Rohm & Haas having a molecular weight within the range 351-393);

(b) N-lauryl (trialkyl methyl) aine (lauryl=dodecyl) (Amberlite LA 2 (Registered Trade Mark); a secondary amine supplied by Rohm & Haas having a molecular weight within the range 353-395;

(c) Amine 9D-178 (a secondary amine mixture);

(d) Armeens (Registered Trade Mark) and Ethomeens (Registered Trade Mark) supplied by Armour-Hess Chemicals.

Teritary amines which may be used in step (b) above (in both aspects of the invention) are preferably those of the type $R_3N$ where the R groups are the same or different and are aliphatic. Preferred R groups are normal alkyl ranging from $C_6$–$C_{12}$. Iso-alkyl and cycloalkyl groups may also be used, however, and R may therefore be selected from the group comprising the normal and iso isomers of hexyl, heptyl, octyl, nonyl, decyl, undecyl and dodecyl alkyl groups.

Examples of tertiary amines which may be used are tri-n-hexylamine
methyldi-n-octylamine
tri n octyl amine
tri iso octylamine
tri n-heptylamine
tri iso-heptylamine
tri n-nonylamine
tri iso-nonylamine Aromatic and mixed aliphatic and aromatic R groups may also be used as well as aliphatic groups for the tertiary amine and quaternary ammonium compounds. Examples of tertiary amines and quaternary ammonium compounds are:

triphenylamine
tribenzylamine
diphenyl methylamine
phenyl trimethyl ammonium hydroxide
dimethyl benzylamine
dimethyloctyl benzyl ammonium chloride
tetraoctyl ammonium chloride Examples of commercially available tertiary amines and quaternary ammonium compounds which can be used are:

(a) Arquad 2HT (Registered trade mark; a dimethyl dioctadecyl quaternary ammonium chloride.
(b) Ethomeens (Registered trade mark for tertiary amines and quaternary ammonium compounds, mostly water insoluble, supplied by Armour - Hess).
(c) Adogens (Registered trade mark; supplied by Ashland Chemicals).
 Adogen 364 Tri-n-alkyamine, predominantly C9
 Adogen 381 Tri-iso octylamine
(d) Alamines (Registered Trade Mark; tertiary amines supplied by General Mills).
 (Alamine 336 Tricaprylamine, predominantly $C_8$–$C_{10}$ (Capryl=octyl)
 Alamine 308.
(e) Aliquats (Registered Trade Mark; quaternary ammonium compounds supplied by General Mills): Aliquat 336 methyl tri-n-alkylammonium chloride; a quaternary having predominantly $C_6$–$C_{10}$ normal alkyl groups.

Other compounds which we have found useful as anionics phase transfer catalysts include substituted amino acids, for example N,N-dialkylglycine, N-methyl N-acetylglycine and similar lower aminoacids, pyridinium compounds, diamines, tertiary sulphonium compounds such as $[(C_8H_{17})_2S+CH_3]_2SO_4^{2-}]1$ ethoxylated tertiary amines, i.e.

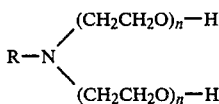

where n may be for example 1, 5 or 10, tertiary phosphines such as trioctyl phosphine and quaternary phosphonium and arsonium compounds such as hexadecyl-tri-n-butyl phosphonium bromide or tetraphenyl arsonium chloride.

We believe that anionic phase transfer catalysts used in the process of the present invention transfer palladium as an anionic species, for example $[PdCl_4]^{2-}$, into the organic phase, thereby increasing the rate of extraction by the oxime, the catalyst then returning the liberated chloride ions to the aqueous phase and becoming available for further transfer of palladium.

The palladium is recovered as previously described in the prior art specification U.S. Pat. No. 3,967,956 from the acid stripping solution using an anion exchange method and we have found that one very suitable technique is to pass the palladium-containing solution through an anion exchange column. Palladium may then be eluted from the column by the use of an ammonia/ammonium chloride solution. The palladium leaves the column as the tetramine ion $Pd(NH_3)_4^{2+}$. The tetramine solution is then acidified with hydrochloric acid to produce $Pd(NH_3)_2Cl_2$ which is an insoluble yellow salt. Copper remains in solution at this point.

Pure palladium may be obtained from the insoluble salt $Pd(NH_3)_2Cl_2$ by reduction. Suitable reductants are ethylene, formaldehyde, oxalate, formate, hydrazine and hydrogen under pressure. An alternative method of reduction to the metal is calcination of the solid followed by reduction with hydrogen.

By the use of this technique, of the platinum group metals present, only palladium with a very small quantity of platinum is extracted into the oxime plus amine extraction system and none of the base metals except copper are exchanged onto the anion exchange resin. Copper subsequently remains in solution as detailed above. The invention, therefore, offers a route by which palladium may not only be rapidly separated from other platinum group metals and base metals, but also by which palladium having high degree of purity may be obtained.

The anion exchange resin which we prefer to use is a strongly basic anion resin which converts to the chloride form, when stripped of palladium.

Feed solutions can vary greatly in concentrations of platinum metals. The examples described above give results obtained with a typical feed solution.

The following percentage recovery and purity were obtained without any further refining steps, namely Pd recovery: 98.0%
Pd purity: 99.9%

We claim:

1. In a process for the selective separation and purification of palladium which is present in an aqueous solution with at least one other platinum group metal comprising the following steps:
    (a) adjusting the pH of the aqueous solution to render it acidic;
    (b) contacting the so-obtained acidic solution with an organic phase containing an oxime extractant for palladium, and
    (c) removing from contact with the acidic solution the organic phase containing substantially all of the palladium, the improvement which comprises catalytically accelerating the said separation by including with the oxime extractant at step (b) from about 100 to 2000 ppm, based upon the total of said organic phase containing the oxime extractant, of an anionic phase transfer material selected from the group consisting of primary amines, secondary amines, tertiary amines, quaternary ammonium compounds and sulphur-phosphorus- and arsenic-containing organic compounds having a molecular weight in the range 150–900 so as to be substantially soluble in the organic phase and substantially insoluble in the aqueous phase.

2. A process according to claim 1 wherein the anionic phase transfer material includes a primary amine having a tertiary alkyl substituent.

3. A process according to claim 1 wherein the said oxime is in solution with an aliphatic or aromatic hydrocarbon diluent.

4. A process according to claim 1 wherein the oxime is a hydroxy oxime.

5. A process according to claim 4 wherein the hydroxy oxime is selected from the group consisting of alpha hydroxy oximes of the general formula:

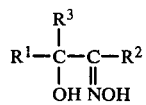

and orthohydroxyphenoneoximes of the general formula:

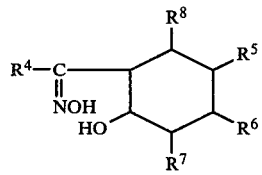

where $R^1$, $R^2$, $R^3$ and $R^4$ are the same or different and may be hydrogen, alkyl, aryl, aralkyl, alkaryl and substituted alkyl, aryl, aralkyl and alkaryl groups in which the substituent is inert to the palladium solvent extraction reaction conditions; $R^5$, $R^6$, $R^7$ and $R^8$ are normal or iso alkyl or substituted normal or iso alkyl in which the substituent is inert to the palladium solvent extraction reaction conditions.

6. A process according to claim 5 wherein the orthohydroxyphenoneoxime has the general formula:

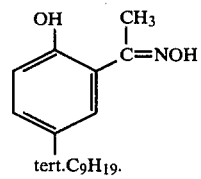

7. A process according to claim 6 including the use of a secondary aimine of the type $R_2NH$ where the R groups are the same or different.

8. A process according to claim 7 wherein the R groups are selected from group consisting of aliphatic, aromatic, mixed aliphatic and aromatic, which may be substituted or unsubstituted and may together form an aliheterocyclic ring with the N atom.

9. A process according to claim 1 wherein any adjustment of the pH at step (a) is carried out by the addition of an aqueous solution of acid or alkali.

10. A process according to claim 9 wherein the pH is adjusted using a dilute sodium hydroxide solution or a dilute hydrochloric acid solution to produce an acidity within the range 3N to pH 4.

11. A process according to claim 10 wherein the acidity has a pH value of 1.

12. A process according to claim 1 wherein after step (c) the palladium is stripped from the oxime by the use of a relatively strong solution having a strength within the range 3N–12N.

13. A process according to claim 1 wherein the anionic phase transfer material is a primary amine of the type $RNH_2$ where R is normal-, iso- or cyclo-aliphatic aromatic or mixed aliphatic and aromatic, either substituted or unsubstituted.

14. A process according to claim 13 wherein R is a branched chain alkyl group within the range $C_{10}$–$C_{25}$ and producing a molecular weight to the amine of at least 150.

15. A process according to claim 1 including the use in step (b) of a tertiary amine of the type $R_3H$ where the R groups are the same or different and are aliphatic.

16. A process according to claim 15 wherein R is selected from the group consisting of normal alkyl ranging from $C_6$–$C_{12}$, iso-alkyl and cyclo-alkyl groups.

17. A process according to claim 15 in which the R groups are the same or different and are aromatic or mixed aliphatic and aromatic.

18. A process according to claim 1 including the use in step (b) of a quaternary ammonium compound as anionic transfer material.

19. In a process for the selective separation and purification of the palladium which is present in solution with at least one other platinum group metal comprising the following steps
(a) acidifying the solution to give a pH within the range 0–4;
(b) contacting the acidified solution with an organic solvent containing a hydroxyoxime extractant for palladium selected from the group consisting of alpha hydroxyoximes of the general formula:

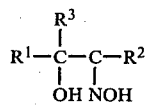

and orthohydroxyphenoneoximes of the general formula:

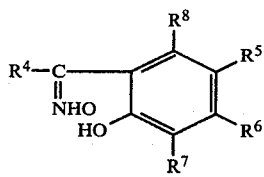

where:
(i) $R^1$, $R^2$, $R^3$ and $R^4$ may be the same or different and are selected from the group consisting of hydrogen, unsubstituted alkyl, aryl, aralkyl and alkaryl and substituted alkyl, aryl, aralkyl and alkaryl in which the substituent is inert to the palladium solvent extraction reaction conditions;
(ii) $R^5$, $R^6$, $R^7$ and $R^8$ may be the same or different and are selected from the group consisting of halogen, nitro, hydrogen, unsubstituted normal or iso alkyl and substituted normal or iso alkyl in which the substituent is inert to the palladium solvent extraction reaction conditions,
(c) removing from contact with the acidified aqueous solution an organic phase containing substantially all of the palladium present in association with the said oxime extractant, and
(d) stripping the palladium from the organic phase containing the oxime extractant by the use of a strongly acidic solution, the improvement which comprises catalytically accelerating the said separation by including with the oxime extractant at step (b), from about 100 to 2000 ppm, based upon the total of said organic solvent plus hydroxyoxime extractant, of an anionic phase transfer material selected from the group consisting of primary amines, secondary amines, tertiary amines, quaternary ammonium compounds and sulphur-phosphorus- and arsenic-containing organic compounds having a molecular weight in the range 150–900 so as to be substantially soluble in the organic phase and substantially insoluble in the aqueous phase.

* * * * *